Oct. 8, 1968  A. H. HOFFMANN  3,405,339

SYNCHRONOUS MOTOR FIELD CONTROL SYSTEM

Filed Oct. 18, 1965

WITNESSES:
Bernard R. Gieguey
Choy Strickland

INVENTOR
Arthur H. Hoffmann.
BY F. P. Lyle
ATTORNEY 3,405,339
SYNCHRONOUS MOTOR FIELD
CONTROL SYSTEM
Arthur H. Hoffmann, Monroeville, Pa., assignor to
Westinghouse Electric Corporation, Pittsburgh, Pa.,
a corporation of Pennsylvania
Filed Oct. 18, 1965, Ser. No. 497,397
11 Claims. (Cl. 318—176)

ABSTRACT OF THE DISCLOSURE

A circuit arrangement for measuring one half cycle of one polarity of a synchronous machine slip frequency to accurately determine proper rotor speed for applying DC excitation, and for delaying a field energizing output signal during the next half cycle of the opposite polarity for a period of time complementary to the time it takes for relay contactors to close in applying excitation energy to the field of the machine.

---

The present invention relates to synchronous motor control systems, and particularly to systems in which direct current is applied to the motor field at an optimum time for synchronization by an exact control of field contactor energization based upon the precise sensing of motor slip frequency.

Generally, a control system for a synchronous motor includes a field discharge circuit for discharging induced field current during the start-up period and a direct current excitation circuit for energizing the motor field winding at synchronous speed and initiating energization in a predetermined terminal interval of the start-up period. The presynchronization application of direct current excitation to the field winding is ordinarily necessary to develop the pull-in torque required to synchronize the motor. Just before or after synchronization, the field discharge circuit must be opened or removed from operation so as to prevent current drain from the excitation circuit.

For greater detail on the theory of synchronization, reference is made to a copending application entitled "Brushless Synchronous Motor Control System and Circuitry Therefor," Ser. No. 368,484, filed by F. V. Frola on May 19, 1964 and assigned to the present assignee.

As indicated in the Frola application, switching devices and other components in the control circuitry of a brushless synchronous motor preferably are solid state or static devices since they are shaft-mounted and subjected to forces of rotation. While the present invention is generally applicable to any type of motor, including the brushless type such as disclosed in the Frola application, it is particularly suitable for standard (nonbrushless) synchronous machines in which the switching devices and components are disposed in a fixed location, and mechanical relay switches and contactors are employed to control direct current field energization.

It is most important that the actual delivery of the direct current to the motor field occur at a time that will insure maximum stability in synchronization. If direct current application is not precisely timed, the motor may slip back from synchronism and be tripped from the line, or the stator may momentarily draw larger power from the line than is desired. A major cause contributing to inopportune timing in direct current application for synchronization is the delay time inherent in relay armature and field contractor actuation. Such a delay in armature and contactor actuation (closing time) can cause the actual delivery of the direct current to the motor field to occur later than the optimum time, which results in the problems mentioned above. Further, it is important that any means designed to control direct current application to the field be easily adjustable to allow for changes in contactor closing delay time and for changes generally in the operating characteristics of synchronous machines.

In accordance with the broad principles of the present invention, a synchronous motor system includes a direct current excitation circuit and a circuit for discharging field current induced by induction motor action employed to start the motor. In the excitation circuit are provided contactors that directly control the application of a direct current to the rotating field winding of the synchronous motor. Connected across the direct current leads is a control circuit and switch that is in turn connected to and controlled by a static, solid state control circuit that senses the proper rotor speed for timely aplication of direct current excitation voltage. The proper rotor speed is sensed by sensing the frequency and phase of the slip voltage induced in the rotor field winding and developed across a discharge resistor connected across the field winding. The control circuit comprises two timing circuits, the first of which senses the time of a first positive half cycle of the slip frequency. Only if the slip frequency (time) is proper for synchronization does the first timing circuit energize a second timing circuit that delays its signal output for a period of time (during the negative swing) corresponding to the closing delay time of the contactors. The second timing circuit produces a switch energizing pulse at a point in time on the ngeative half of the slip cycle that complements the delay in contact closing time so that when the closing of the field contactor actually occurs, excitation is applied to the rotor field winding at the first voltage zero before the next positive swing of the slip cycle thereby making possible full utilization of the positive half cycle to develop pull-in torque. The timing (RC) circuits are provided with adjustment means to insure precise timing control to allow for changes in the operating characteristics of the circuits and machines, and to provide an easily adaptable circuit operable with different types of relays and power contactors.

Therefore, an object of the present invention is to provide an effective synchronous motor control and excitation system in which the application of direct current excitation is exactly timed to insure maximum synchronization stability with minimum electrical power withdrawn from the main motor supply.

Another object of the invention is to provide a novel control system for a synchronous motor in which a simple and inexpensive circuit having no moving parts is used to control a means for actuating a power contactor.

A further object of the invention is to provide a novel control circuit in which a first timing circuit accurately measures a positive half cycle of a particular frequency and a second timing circuit delays a predetermined time before the control circuit produces an energizing signal.

Yet another object of the invention is to provide an efficient and adjustable control circuit in which actuator and contactor closing delay times are allowed for before an output signal is produced.

Still another object of the invention is to provide a novel excitation circuit for synchronous machines that are accurate to a degree of one cycle per second of slip frequency.

These and other objects of the invention will become apparent upon consideration of the following detailed description along with the attached drawing in which.

Figure 1:
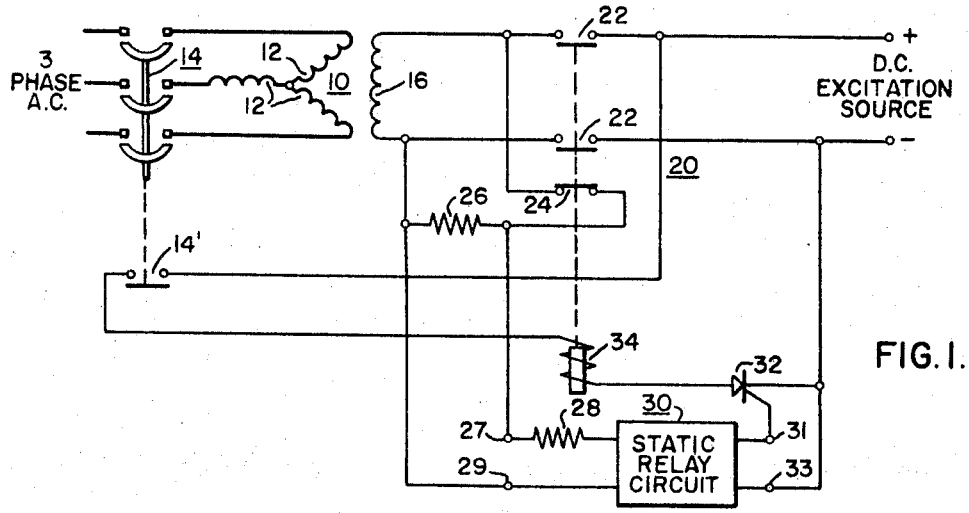
FIGURE 1 is a schematic view of a standard synchronous motor and its control system constructed in accordance with the principles of the present invention.

Specifically, there is shown schematically in FIG. 1 a synchronous motor 10 having any suitable power rating. Motor 10 has a three-phase stator winding 12 and field winding 16, both of which are physically constructed and mounted in any manner well-known in the synchronous machine art. Though a three-phase motor is shown, the invention is not limited thereto.

Stator winding 12 is energized by a three-phase source of alternating current (not shown) through the closing of a suitable stator breaker 14. The field winding 16 is excited by a suitable source of direct current (not shown) through the closing of contactor 22 in manner to be fully explained hereinafter.

Stator winding 12 produces a rotating magnetic flux wave in the air gap of motor 10 and thereby interacts with motor field winding 16 and amortisseur windings (not shown) to produce start-up and synchronous operating torques for the rotor of motor 10. Field winding 16 and the amortisseur windings can be suitably disposed on a predetermined number of salient rotor poles in accordance with well established synchronous motor design principles.

During the start-up period, with the rotation of field winding 16 through the magnetic field produced by energized stator winding 12, a voltage is induced in winding 16. If the circuit in which winding 16 is employed were left open, a high voltage would be induced in the field winding which could damage winding and pole insulation. Therefore, in order to discharge this induced voltage, a discharge resistance 26 is connected across winding 16. Resistance 26 remains across the winding until synchronous rotor speed is reached or nearly reached, at which time contactor or breaker means 24 opens in a manner to be more fully explained hereinafter.

Substantial start-up torque can be derived from the resulting resistive component of current through the field windings. Special amortisseur windings or cage windings are usually provided on the rotor pole faces to produce an induction motor torque which, when combined with the torque produced by the closed field windings, provides the necessary or desired total start-up torque. After synchronism, motor control circuitry 20 operates to open the field discharge circuit via breaker 24; after the excitation voltage has been applied and the synchronization obtained, resistance 26 would serve only to drain the field excitation current; therefore resistance 26 is removed and the circuit opened by the opening of breaker 24.

The control circuit 20 operates generally to close field excitation contactors 22 by measuring the alternating current voltage induced in winding 16 and appearing across discharge resistor 26. As mentioned earlier, the measuring or sensing of this voltage frequency (slip frequency) is accomplished by a static, solid state control circuit generally designated 30 in FIG. 1. When the rotor of motor 10 reaches a synchronous speed, static control circuit 30 produces an output signal that is applied to the gate of a solid state switching device 32 which can take the form of a thyristor or silicon controlled rectifier. The output signal from circuit 30 turns on switching device 32 which causes a current path to be completed through field solenoid 34 which in turn actuates and closes field contactors 22. The energization of solenoid 34 further operates to open contactor 24 which may be a back contact on the field relay and contactor unit. Thus, when contactors 22 close to apply direct current excitation to the field of motor 10, contactor 24 opens to remove the discharge circuit and resistor 26 from across field winding 16 and the excitation circuit. Contactor 14', connected in series with solenoid 34, is operable with the actuation of breakers 14 in the main supply to stators 12 so that contactor 14' provides a current path in series with solenoid 34 and switch 32 as long as stator breakers 14 remain closed.

Figure 2:
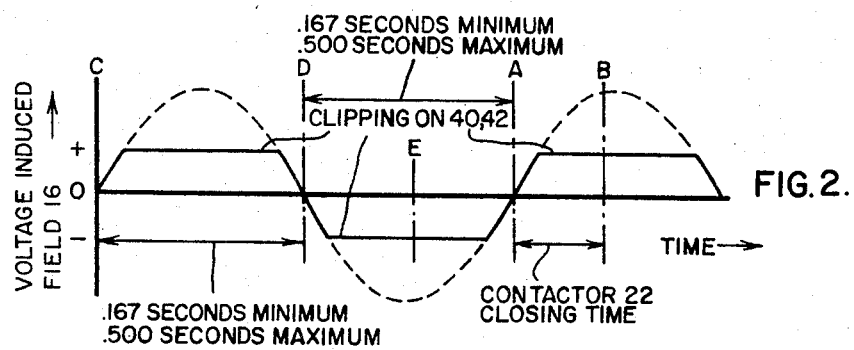
FIGURE 2 is a waveform representative of the slip voltage cycle with a synchronous rotor speed.

FIG. 2 shows a waveform of the slip voltage frequency appearing across starting resistor 26 at a motor speed appropriate for synchronization. If motor 10 has just achieved this speed, it is most desirable to deliver direct current excitation to the field windings at a time shown by A. However, if the solenoid 34 actuates contactors 22 at point A, closing delay time of the contactors will cause delivery of the excitation current to the motor field at a point B on the waveform as shown, and motor 10 would in all probability not synchronize. The direct current excitation should be applied at the beginning of the positive swing of the slip voltage cycle in order to effect maximum pull-in torque. Therefore, 34 should be actuated at a point in time that complements contactor delay time as depicted by points A and B in FIG. 2.

Figure 3:
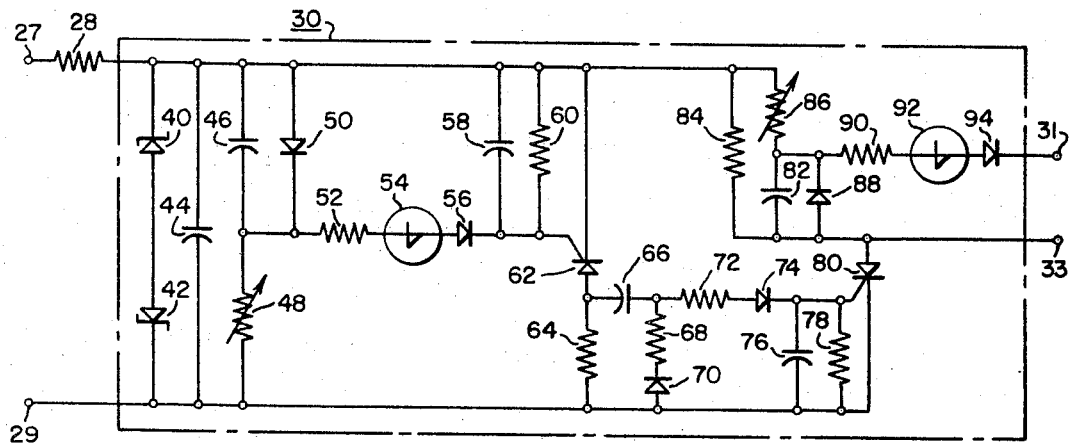
FIGURE 3 is a schematic diagram of the preferred embodiment of a control circuit employed in the system of FIG. 1.

The circuit shown in FIG. 3 is similar to that shown and described in copending application Ser. No. 460,265, filed June 1, 1965 by Hoffmann et al and assigned to the present assignee. A slip frequency measuring circuit is shown that produces a field energizing pulse from the positive half of the voltage appearing across a discharge field circuit resistor. The circuit further produces a pulse signal that energizes an instantaneously operating switching device that directly applies excitation current to the field of a synchronous machine. However, the circuit described therein shows no means for taking into consideration contactor delay time since the disclosure is directed primarily to brushless systems and instantaneously operating switches, such as silicon controlled rectifiers in the field excitation circuit.

The novel circuit shown in FIG. 3 senses the proper motor speed by sensing the positive half cycle of the slip frequency (duration C to D) and then delays producing a relay (34) energizing signal output for the duration D to E. At point E circuit 30 produces an output pulse that gates switch (32) to an on (conducting) condition thereby energizing 34. The approximate time it takes for field contactors 22 to close and apply the direct current to winding 16 is (as shown in FIG. 2) the time duration of E to A equal to time A to B. At point A, then, direct current excitation is applied to the field windings of motor 10 by circuit 30 sensing proper motor speed for synchronization. Thus, point A on the slip cycle is the optimum synchronizing time and the delay duration D to E supplements the time delay involved in contactor closing.

The static control circuit 30 (FIG. 3) includes input terminals 27 and 29 preferably connected across field winding 16 and discharge resistor 26 in order to obtain direct response to the slip voltage frequency. Circuit 30 further includes output terminals 31 and 33 connected respectively to the gate and cathode of switch means 32 as indicated in FIG. 1. The slip frequency voltage is applied to Zener diodes 40 and 42 through a current limiting resistor 28 to produce a clipped and reduced voltage for application to an RC energy storage and timing circuit comprising variable resistor 48 and timing capacitor 46. By clipping the field voltage, circuit 30 can be standardized for employment with motors of various ratings, and lower rated circuit components can be used.

Timing capacitor 46 charges through adjustable resistor 48 and achieves the threshold voltage level of a Shockley diode 54 at the proper slip frequency. That is, until the rotor of motor 10 reaches synchronous or near synchronous speed, the time constant of RC circuit 46, 48 will not allow a voltage to develop across diode 54 sufficient to effect its conduction. (Diode 54 has a switching characteristic that produces a substantially zero impedance when presented with a predetermined level of voltage.) When diode 54 does conduct (which is at critical motor speed) a discharge pulse flows through current limiting resistor 52, diodes 54 and 56 and bias setting resistor 60 for solid state switching device 62. (Diode 56 prevents current reversals conducting through Shockley diode 54.)

Switching device 62, preferably a silicon controlled rectifier, is gated or fired by the discharge pulse through the diode 54 permitting a capacitor 66 to be charged by the voltage of Zener (clipping) diodes that now appears across a current limiting resistor 64. Capacitor 66 charges through resistor 68 and diode 70. Capacitor 66 holds its charge until the voltage from terminals 27 to 29 reverses (point D in FIG. 2) and terminal 29 becomes more positive than terminal 27 which is shown in FIG. 2 as the negative half cycle. When point D is reached by the slip voltage cycle, a reverse polarity is applied across the cathode and anode terminals of the switching device 62 which is then switched to a non-conductive state. Since current is blocked from flowing through the charging circuit resistor 68 by diode 70, capacitor 66 discharges through a current limiting resistor 72, a current directing diode 74, bias setting (gate) resistor 78 and resistor 64.

The gate and cathode terminals of a solid state switching device 80 are connected across resistor 78 and a capacitor 76 which suppresses high frequency voltage spikes. The discharge of capacitor 66 gates (turns on) switch 80 which completes a circuit from input terminal 27 to input terminal 29 through an adjustable resistor 86 and a capacitor 82.

The charging time of capacitor 82 is set (via variable resistor 86) to equal the time D to E on the slip voltage cycle as shown in FIG. 2. At time (point) E capacitor 82 discharges through Shockley diode 92 to gate relay actuating switch 32 (FIG. 1) via output terminals 31 and 33. When diode 92 conducts, a pulse of sufficient magnitude and duration is applied to switch 32, via terminals 31 and 33, from the discharge of capacitor 44 connected across clipping diodes 40 and 42 in the input circuit. Capacitor 44 accumulates stored energy in the negative half cycle (D to E) so as to increase the total available energy for generating the solenoid 34 energizing pulse at point E on the slip voltage cycle. For the time duration E to A, relay contactors 22 are closing. At point A the contactors are closed and excitation current is applied to the field winding 16 at an optimum time, i.e., at the best slip voltage frequency and at a time when the salient poles are in aiding relation with the air gap flux, created by stator winding 12.

The time constant of resistor 64 and capacitor 66 must be sufficiently long to continue to gate switching device 80 until capacitor 44 begins discharging, and a resistor 84 allows switching device 80, when gated, to maintain its holding current until capacitor 44 discharges.

Diodes 50, 56, 70, 74, 88 and 94 are employed as blocking elements against reverse power flow. Capacitors 58 and 76 are used to filter spurious pulses, such as high frequency voltage spikes, in the gate circuits of switching devices 62 and 80, respectively.

From the foregoing description it should now be apparent that a novel control circuit has been disclosed that is simple, inexpensive and particularly adaptable for measuring the slip voltage frequency of a synchronous motor and then delaying energization of a field actuator for a period of time to complement for the delay in field contactor closing so that excitation current will be applied to the motor field at an optimum time. By exciting the motor field at the optimum time, that is, at the proper motor speed and field pole position, synchronization is assured with maximum stableness with minimum electrical power consumed. Further, the present novel circuit is accurate to a degree of one cycle per second of slip frequency where a lack of precision in excitation timing is most pronounced. In addition, by using small, lightweight components, the entire control unit can be fitted into a small package with adjustable controls (variable resistors 48 and 86) that permit easy changes in timing circuit parameters for accommodating changes in field relay closing times, relay components and contactors, motor changes and variations in the operating characteristics of the machine. Thus, the present invention provides a flexibility and surety of precise operation heretofore unavailable in the synchronous machine control art.

Though the invention has been described with a certain degree of particularity, it is to be understood that the present disclosure has been made by way of example only and that changes in details, combination and arrangement of parts may be resorted to without departing from the spirit and scope of the invention.

What is claimed is:

1. The circuit of claim 10 in which both timing circuits contain a variable resistive element for changing the time constants of the two circuits.

2. A synchronous machine system having a rotating field and a supply of direct current excitation, a control system for controlling the supply of excitation current to the field comprising an actuator for contactors having a predetermined delay in closing time, a timing circuit for measuring the slip frequency voltage of the rotating field by measuring the time of one half cycle of one polarity of said voltage, a second circuit energized by the timing circuit upon measuring a slip frequency proper for synchronization, said second circuit delaying an output signal for a period of time complementary to the contactor closing time, said second circuit producing an actuator energizing signal at a time within the next half cycle of said voltage and before the next voltage zero, said last mentioned time being equal to the closing time of the contactors.

3. The system of claim 2 wherein the actuator energizing signal gates a switching device connected in electrical series with the actuator.

4. The system of claim 2 wherein the timing circuit is connected across a discharge circuit and field winding of the synchronous machine.

5. The system of claim 2 wherein the timing circuit measures the slip frequency voltage by measuring the time of its positive half cycle.

6. The system of claim 2 wherein the second circuit operates during the negative swing of a slip frequency proper for synchronization and produces an output pulse before the next voltage zero of the negative swing.

7. The system of claim 2 where the timing circuit produces a breakdown potential across a diode when the rotating field reaches a synchronizing speed.

8. The system of claim 7 wherein the breakdown potential gates a first switching device operable to energize the second circuit.

9. The system of claim 8 wherein the first switching device gates a second switching device upon polarity reversal of the slip frequency voltage across the timing circuit.

10. A control circuit connected across a source of alternating voltage comprising a first timing circuit for measuring the frequency of said voltage and producing a breakdown potential across a diode when said voltage attains a predetermined frequency, said breakdown potential gating a switching device which is operable to energize a second timing circuit, said second circuit producing an output signal after a predetermined length of time, said second circuit being controlled by gating a second switching device.

11. A control circuit connected across a source of alternating voltage comprising a first timing circuit for measuring the frequency of said voltage and producing a breakdown potential across a diode when said voltage attains a predetermined frequency, a capacitor connected across said timing circuit, said breakdown potential gating a switching device which is operable to energize a second timing circuit, the anode circuit of said switching device containing an RC circuit having a time constant sufficiently long so as to gate a second switching device in combination with the second timing circuit for a length of time to allow full charge and discharge of said capacitor.

References Cited

UNITED STATES PATENTS

| | | | |
|---|---|---|---|
| 3,020,463 | 2/1962 | MacGregor | 318—175 |
| 3,350,613 | 10/1967 | Brockman et al. | 318—176 |

ORIS L. RADER, *Primary Examiner.*

G. Z. RUBINSON, *Assistant Examiner.*